UNITED STATES PATENT OFFICE.

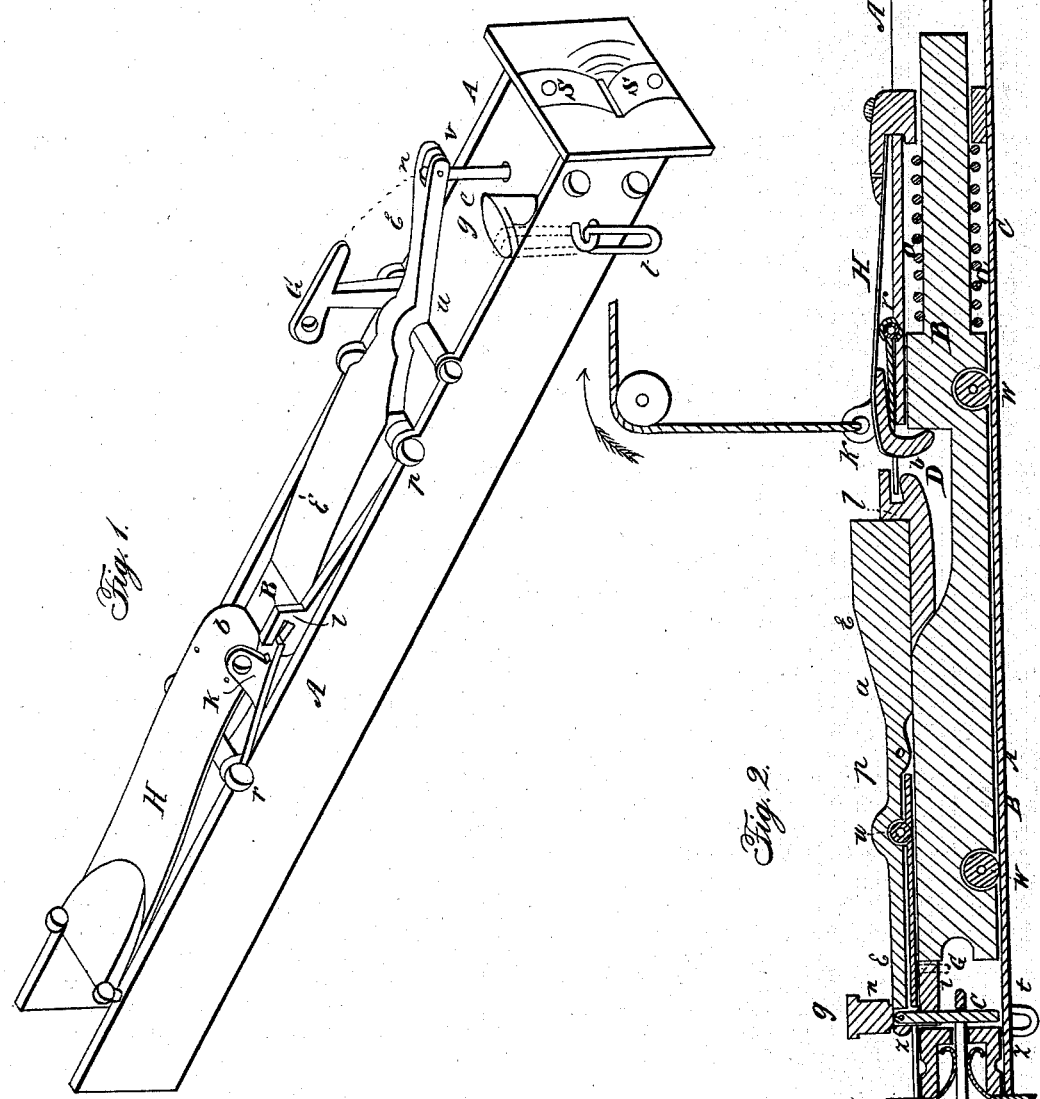

JOHN H. REED, OF NEW HAVEN, CONNECTICUT.

IMPROVEMENT IN CAR-COUPLINGS.

Specification forming part of Letters Patent No. 47,455, dated April 25, 1865.

*To all whom it may concern:*

Be it known that I, JOHN H. REED, dentist, of the city and county of New Haven, in the State of Connecticut, have invented a new and useful Improvement in Car-Couplings; and I do hereby declare that the following is a full, clear, and exact description of the construction, character, and operation of the same, reference being had to the accompanying drawings, which make part of this specification, in which—

Figure 1 is a perspective view of the coupler when detached from the car-body, showing the lever which works the coupling pin and the levers by which it is uncoupled when desired. Fig. 2 is a longitudinal section of the same cut vertically through the center, showing the relative positions of the several parts when the coupling-link or shackle is secured by the coupling-pin.

My improvement consists in the use of a strong bar, (resting freely in a case or box,) which is forced back or inward by the end of the link when it enters the draw-head for the purpose of coupling, where it will be held by a spring-catch or a pawl, and which bar is thrown forward or outward by a spiral spring, or other convenient means, when the catch or pawl is raised; and in the use of a lever which is jointed to the coupling-pin and is operated by the longitudinal motion of the bar; and in the use of a jointed or double-acting lever which operates or raises the catch to allow the bar to pass forward to cause it to uncouple, and in making the inner portion of the draw-head, as hereinafter described, for receiving and holding the link.

I make the case or box A A of iron, or any other suitable material, of the proper size, with its bottom and sides substantially parallel, as represented in Fig. 1 and indicated in section in Fig. 2.

I make the longitudinal bar B B of iron, or any other suitable material, substantially in the form indicated in section—that is, essentially square in the cross-section, except a portion near the inner end, which I make round or cylindrical, as indicated in section at C, Fig. 2, on which I place a spiral spring, as indicated at *a* and *a*, Fig. 2, to press the bar B B outward; and in the central part I cut away the upper portion, as shown at D, Fig. 2, to allow the hook-catch or pawl *b* to descend and hold the bar B B in the position shown in Fig. 2, when the coupling-pin *c* is forced down by the lever E E', when its inner end, E', will rest on the bar B, as shown at *d*, Fig. 2, and render it impossible for the cars to be uncoupled while the bar B is held in that position by the hook-catch or pawl *b*, as shown in Fig. 2, and when the hook or pawl *b* is raised by means of the pedal *g'*, Figs. 1 and 2, (or by the cord *h*, Fig. 2, as they both operate the compound or double-acting levers *k* and *l*, as shown in Figs. 1 and 2,) the bar B B will be thrown forward by the spiral spring *a a*, Fig. 2, so that the end E' of the lever E E' will fall into the space at D, Fig. 2, as indicated at E', Fig. 1, and cause the end E to draw up the coupling-pin *c* to the position shown in Fig. 1, and the bar B B, in its forward motion, will push the coupling-link or shackle F, Fig. 1, beyond the locality of the coupling-pin *c*, so as to uncouple the cars.

I make the coupling-pin *c*, Figs. 1 and 2, in the ordinary way, with an eye or hole in the upper end, so that I can attach it to the end of the lever, as shown at *n*, Fig. 1, and indicated in Fig. 2.

I make the coupling-pin lever E E' substantially in the form shown in perspective in Fig. 1 and in section in Fig. 2, with the rear or inner end much the heaviest, so that when it is not supported by the bar B, as in Fig. 2, it will, by its own gravity, fall into the space D, Fig. 2, and by means of the fulcrum-pin or screw *p*, Figs. 1 and 2, will raise the coupling-pin *c* out of the link F, and while that remains so—that is, while the end E' can fall in the recess D, Fig. 2—the cars cannot be coupled.

I make the double or compound levers *k* and *l* substantially in the shape shown and indicated in the drawings, and with the front or outer end of the part *l* connected by a joint-pin with the pedal *g*, and the rear end connected with *k*, as shown at *k l*, Figs. 1 and 2, the lever *l* working on the fulcrum *p*, and the lever *k* on the fulcrum *r*, so that by pressing down the pedal *g* (or drawing upon the cord *h*) will raise the hook or catch *b* above the projection and allow the spiral spring *a a*, Fig. 2, to force the bar B B forward, so as to allow the end E' of the lever E E' to fall into the recess D, and thereby raise the coupling-pin *c* out of the link F, and thus uncouple the cars.

I make the hook or catch *b*, Figs. 1 and 2, with a flat spring, as shown at H, or a weight or other means may be used to cause the hook $b$ to fall as a pawl, or otherwise, to retain the bar B B.

I make the coupling-link or shackle in the common form, or with a solid part in the center, making the two parts essentially equal, so that they will work substantially even if the springs $a\ a$, Fig. 2, should happen to be of different strength in the different cars, and of a suitable shape to enter the draw-heads readily, so as to preclude the necessity of any person being present to attend it, all as indicated at F, Fig. 2.

I make the draw-head of the bell-mouth form, so that it will readily receive the link or shackle, as indicated in Figs. 1 and 2, with a pair of flat curved springs, as shown at $s\ s$, to receive, guide, and steady the link, and with the inner portion solid, except the slit through which the link passes freely, so that very little strain comes on the springs, except while guiding the link to the slit, but they very materially assist in holding the link essentially horizontal, so as to cause it to enter the other draw-head with certainty.

To prevent the cars being coupled when not desired, (as while switching them off on a side-track, if the link should enter the draw-head of another car,) I attach to the side of the case or box a link, as $t$, Fig. 1, which may be turned up and passed onto the pedal $g$, as indicated by red dots, which will hold down the pedal, and therefore hold up the hook or catch $b$, so that if the coupling-link should force the bar B inward to the position shown in Fig. 2, and thus cause the coupling-pin $c$ to enter the link F the moment that pressure is released, the spiral spring $a\ a$ will throw the bar B forward so as to allow the heavy end E' of the lever E E' to fall down into the space D, Fig. 2, and lift the coupling-pin $c$ to the position shown in Fig. 1 and out of the link F.

If it should be desired at any time when the cars are coupled to lock them in that position so that they could not be uncoupled by the use of the pedal $g$ nor the cord $h$, a hooked or elbow-shaped lever, as G, Fig. 1, may be used on a fulcrum, as $u$, so that its point may be dropped into the hole at $v$, when it will pass down in front of the bar B, as indicated by dots at G, Fig. 2, which will perform precisely the same duty as the hook or catch $b$ when it is down in the position shown in Fig. 2, and must be raised out by hand or otherwise before the cars can be uncoupled by either the pedal $g$ or the cord $h$, (because the spring $a\ a$ cannot throw the bar B forward while it is there.) And if deemed best, two or more antifriction-rollers may be used in the lower surface of the bar B, as indicated at $w$ and $w$, Fig. 2, to cause the bar to move easily.

The lock-lever G, link $t$, and cord $h$ are only useful on special occasions, as the cord $h$ may be extended so that the engineer or conductor may at pleasure uncouple the rear car or any rear portion of the train, if he finds it necessary; but in general practice they may be simply let alone, as they will not be in the way.

The advantages of my improvements consist in that by bringing the cars together the link F will push back the bar B until it is caught by the hook or catch $b$, when the coupling-link F will be secured by the pin $c$ beyond the possibility of being uncoupled, except by raising the hook or catch $b$, which can only be done by drawing up by the cord $h$ or pressing down the pedal $g$, as it is impossible for the pin $c$ to release the link F while the end E' of the lever E E' rests on the bar B, as shown at $d$, Fig. 2; and in that the pin $c$ can never be in the way of the link F when coupling, because when the hook or catch $b$ is raised the spiral spring $a\ a$ will force the bar B forward, so that the end E' of the lever E E' will fall into the recess D, Fig. 2, as indicated in Fig. 1, and the pin $c$ will be raised; and in that by the use of the curved springs $s\ s$ and the slit in the inward part of the draw-head, as shown at $z\ z$, Fig. 2, the link F will always be held substantially in a horizontal position when it is uncoupled.

What I claim as my invention, and desire to secure by Letters Patent, is—

1. The combination of the bar B B with the lever E E' and catch $b$, when constructed, arranged, and fitted to produce the required result, substantially as herein set forth and described.

2. The combination of the bar B B with the levers $l$ and $k$ and the spring $a\ a$, when constructed, arranged, and fitted for uncoupling, substantially as herein described.

3. The combination of the lever E E' with the coupling-pin $c$ and link F, when constructed and fitted for use, substantially as herein described.

4. The combination of the lock-lever G with the bar B B, when combined and made to operate substantially as herein described.

5. The combination of the draw-head with the link F, when constructed and fitted for use, substantially as herein described.

6. The combination of the link $t$ with the pedal $g$, when fitted to prevent coupling, substantially as herein described.

J. H. REED.

Witnesses:
 JAS. A. AUSTIN,
 R. FITZGERALD.